United States Patent
Collier et al.

(10) Patent No.: US 9,179,111 B2
(45) Date of Patent: Nov. 3, 2015

(54) PORTABLE HANDHELD VIDEO MONITORS ADAPTED FOR USE IN THEATRICAL PERFORMANCES

(71) Applicant: Event Show Productions, Inc., Tampa, FL (US)

(72) Inventors: Dorene M. Collier, Tampa, FL (US); Alfred J. LeBlanc, Tampa, FL (US)

(73) Assignee: Event Show Productions, Inc., Tampa, FL (US)

( * ) Notice: Subject to any disclaimer, the term of this patent is extended or adjusted under 35 U.S.C. 154(b) by 0 days.

(21) Appl. No.: 14/261,949

(22) Filed: Apr. 25, 2014

(65) Prior Publication Data

US 2014/0320739 A1  Oct. 30, 2014

Related U.S. Application Data

(60) Provisional application No. 61/854,523, filed on Apr. 26, 2013.

(51) Int. Cl.
| | |
|---|---|
| H04N 5/66 | (2006.01) |
| H04N 9/12 | (2006.01) |
| G06F 3/14 | (2006.01) |
| H04N 21/41 | (2011.01) |
| H04N 21/4143 | (2011.01) |
| H04N 21/43 | (2011.01) |
| G06F 1/16 | (2006.01) |

(52) U.S. Cl.
CPC ................ *H04N 9/12* (2013.01); *G06F 1/1632* (2013.01); *G06F 3/14* (2013.01); *H04N 21/4122* (2013.01); *H04N 21/4143* (2013.01); *H04N 21/4307* (2013.01); *G06F 1/1607* (2013.01)

(58) Field of Classification Search
CPC . H04N 9/12; H04N 21/4143; H04N 21/4307; H04N 21/4122; G06F 3/14; G06F 1/1607; G06F 1/1632
USPC ........ 348/383, 36, 38, 500, 838; 345/1.1, 1.3; 40/577, 605; 434/307 R, 428, 430; 340/691.4, 691.6; 361/679.55, 679.56
See application file for complete search history.

(56) References Cited

U.S. PATENT DOCUMENTS

| | | | |
|---|---|---|---|
| 5,973,607 A | | 10/1999 | Munyon |
| 5,987,164 A | * | 11/1999 | Szeliski et al. ................. 382/154 |
| 6,084,553 A | * | 7/2000 | Walls et al. .................... 715/781 |

(Continued)

OTHER PUBLICATIONS

PCT International Search Report and Written Opinion, International Application No. PCT/US14/35471, Applicant Event Show Productions, Inc., dated Sep. 10, 2014.

*Primary Examiner* — Victor Kostak
(74) *Attorney, Agent, or Firm* — GrayRobinson, P.A.; Michael J. Colitz, III

(57) ABSTRACT

Disclosed is a system for generating and synchronizing video across multiple displays during a theatrical performance. In particular, the disclosure relates to individual handheld video monitors that can be arranged to create larger images or video. The system is adapted for use in theatrical performances during which performers manipulate and selectively arrange the monitors to produce differing visual effects. Each of the video monitors includes a computer and associated software for playing back still or video images. A control computer can wirelessly access each of the individual laptops to increase or decrease the rate at which the video or images appear. This allows all of the video monitors to be synchronized during the course of a performance.

6 Claims, 4 Drawing Sheets

(56) References Cited

U.S. PATENT DOCUMENTS

| | | |
|---|---|---|
| 6,393,745 B1 | 5/2002 | Miki |
| 6,501,441 B1* | 12/2002 | Ludtke et al. .................. 345/1.1 |
| 6,690,337 B1* | 2/2004 | Mayer et al. ................... 345/1.1 |
| 6,864,921 B2* | 3/2005 | Kaneda et al. ................. 348/383 |
| 7,174,664 B2 | 2/2007 | Spencer |
| 7,250,978 B2* | 7/2007 | Lee et al. ...................... 348/383 |
| 7,265,970 B2 | 9/2007 | Jordan |
| 7,453,418 B2* | 11/2008 | Palmquist ...................... 345/1.1 |
| 7,675,479 B2* | 3/2010 | Jung .............................. 345/1.3 |
| 7,787,240 B2 | 8/2010 | Swain |
| 7,940,329 B2* | 5/2011 | Houmeau et al. ............. 348/383 |
| 8,102,331 B1* | 1/2012 | Moscovitch ................... 345/1.1 |
| 8,269,691 B2* | 9/2012 | Watson .......................... 345/1.1 |
| D670,764 S | 11/2012 | Han |
| 8,779,265 B1* | 7/2014 | Gottlieb .......................... 84/600 |
| 2007/0110735 A1* | 5/2007 | Hempstead et al. ....... 424/93.21 |
| 2007/0119734 A1* | 5/2007 | Pichahchi ..................... 206/320 |
| 2010/0124013 A1* | 5/2010 | Mitchell ................... 361/679.55 |
| 2012/0062475 A1* | 3/2012 | Locker et al. ................. 345/173 |
| 2012/0097831 A1 | 4/2012 | Olukotun et al. |
| 2012/0175396 A1* | 7/2012 | Patino ........................... 224/627 |
| 2013/0265487 A1* | 10/2013 | Yu et al. ........................ 348/383 |
| 2013/0292480 A1* | 11/2013 | Harmel et al. ................ 235/494 |
| 2014/0009366 A1* | 1/2014 | Chang ............................ 345/1.1 |

* cited by examiner

PORTABLE HANDHELD VIDEO MONITORS ADAPTED FOR USE IN THEATRICAL PERFORMANCES

CROSS-REFERENCE TO RELATED APPLICATIONS

The application claims priority to application Ser. No. 61/854,523 filed on Apr. 26, 2013. The contents of this co-pending application are fully incorporated herein.

BACKGROUND OF THE INVENTION

1. Field of the Invention

The present disclosure relates portable video monitors. More specifically, the present invention relates to portable handheld video monitors that are adapted for use in theatrical performances.

2. Description of the Background Art

It is known in the art to combine individual displays to generate a larger image. For example, U.S. Pat. Publication 2012/0062475 discloses an apparatus, system, and method are disclosed for combing multiple displays on multiple portable electronic computer devices to form a larger display. U.S. Pat. Publication 2013/0265487 discloses a video playback system for jointly displaying video with multiple screens, includes multiple portable communication devices. Yet, neither of these disclosures relates to the use of video displays in the context of a theatrical performance. As such, none of these references allows for the synchronization of displays by a director or choreographer.

Wearable or handheld displays are also known in the art. For instance, U.S. Pat. No. 5,973,607 to Munyon discloses a portable programmable electronic sign. U.S. Pat. No. 7,265,970 to Jordan discloses an apparatus for supporting a mobile electronic display system. The apparatus includes a power source, a wearable computer, and a display element. Although wearable or handheld displays are known, it is heretofore unknown to incorporate multiple displays for the creation of a larger composite image. Nor is it known to generate such a composite image in the context of a theatrical performance.

Thus there exists a need in the art for handheld video monitors that can be manipulated by performers during a theatrical performance and that allows for the associated images to be synchronized during the performance.

SUMMARY OF THE INVENTION

It is therefore an object of the present disclosure to allow multiple handheld video monitors to be used in a choreographed, theatrical performance.

It is another object of this disclosure to allow multiple handheld video monitors to be selectively brought together to generate a larger composite image.

Still yet another object of this disclosure is to provide multiple video monitors that can be wirelessly controlled to allow displayed images to be synchronized.

For the purposes of summarizing this invention, the invention comprises a system for generating and synchronizing video across multiple displays during a theatrical performance. In particular, the disclosure relates to individual handheld video monitors that can be arranged to create larger images or video. The system is adapted for use in theatrical performances during which performers manipulate and selectively arrange the monitors to produce differing visual effects. Each of the video monitors include a computer and associated software for playing back still or video images. A control computer can wirelessly access each of the individual laptops to increase or decrease the rate at which the video or images appear. This allows all of the video monitors to be synchronized during the course of a performance.

Various embodiments of the disclosure may have none, some, or all of these advantages. Other technical advantages of the present disclosure will be readily apparent to one skilled in the art.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

This disclosure relates to a system for generating and synchronizing video across multiple displays during a theatrical performance. In particular, the disclosure relates to individual handheld video monitors that can be arranged to create larger images or video. The system is adapted for use in theatrical performances during which performers manipulate and selectively arrange the monitors to produce differing visual effects. Each of the video monitors includes a computer and associated software for playing back still or video images. A control computer can wirelessly access each of the individual laptops to increase or decrease the rate at which the video or images appear. This allows all of the video monitors to be synchronized during the course of a performance.

Figure 1:
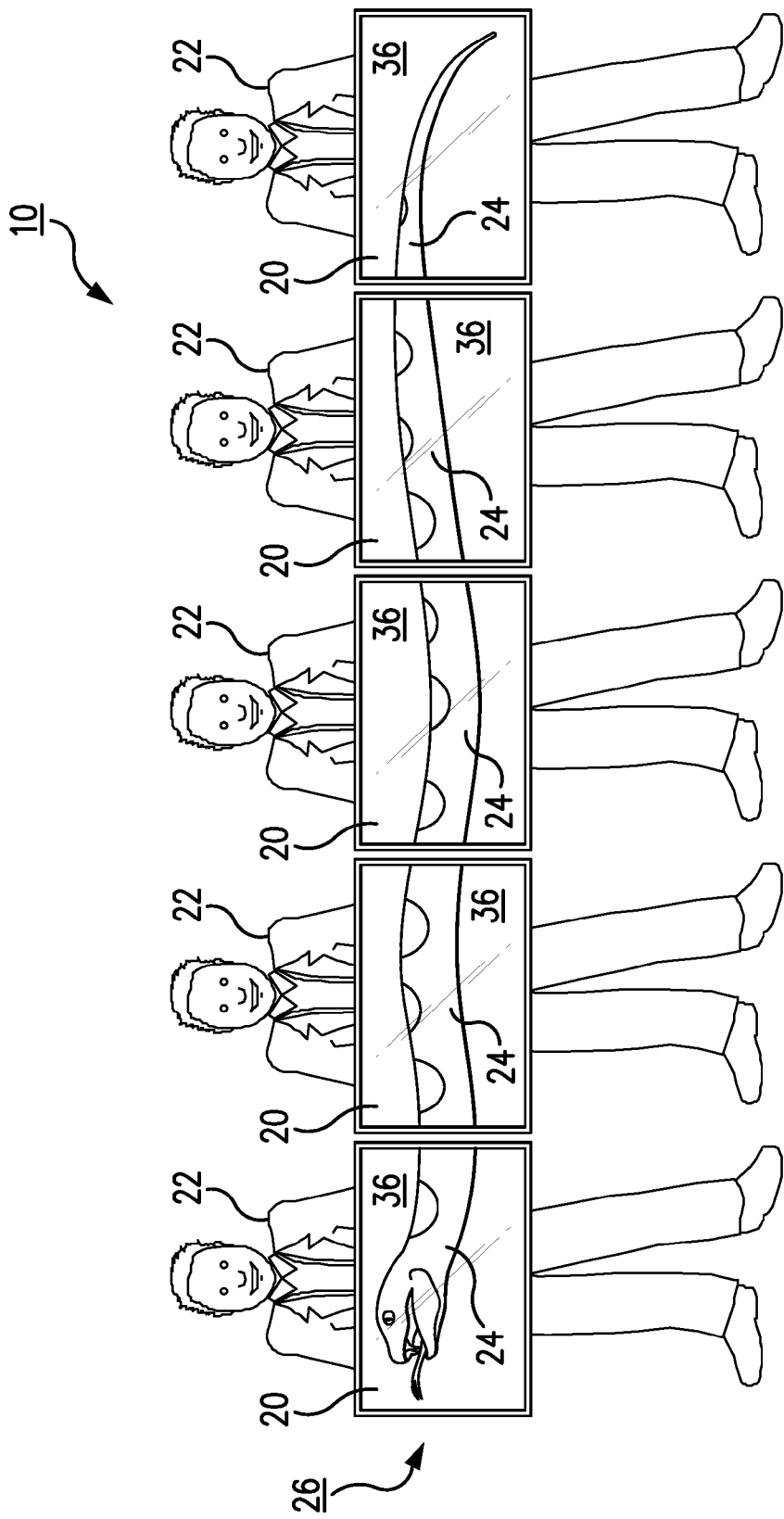
FIG. 1 is a view of the system employed by a number of different performers.

As noted in FIG. 1, system 10 includes a series of individual video monitors 20. Video monitors 20 can employ any of a variety of known display technologies, such as liquid crystal displays (LCD), plasma display panels (PDP), cathode ray tube displays (CRT), light-emitting diode displays (LED), or electroluminescent display (ELD). The monitor's AC power supply is bypassed, and the internal circuitry has been modified to operate on DC voltage, allowing for it to function on battery power. The power is supplied from an external battery stored within a compartment on the back of the monitor.

Monitor 20 is preferably sized to be held and manipulated by the performer 22. Each monitor 20 is adapted to display a series of images that are generated from an associated computer. As used in this application, the term "image" is inclusive of static images, moving video, photographs, drawings, renderings, or any other still or moving images that are perceptible by the audience. During the course of a performance, each monitor 20 can display with complete image or a sub-image 24. As used herein, "sub-image" refers to any portion of a larger composite image. Furthermore, "theatrical performance" refers to any presentation involving performers and video monitors. For example, in FIG. 1, each of the video monitors 20 is displaying a sub-image 24, with the larger composite image 26 being a snake. Each of the performers 22 can, in a choreographed fashion, bring the monitors 20 together to selectively display the larger composite image 26. It is intended that the composite images 26 will change over the course of a performance with the composite images 26 being displayed in a choreographed fashion during the course of a performance.

Each of the video monitors 20 share a similar construction. Each monitor 20 includes an outer housing that is defined by an upper edge 28, a lower edge 32 and opposing side edges 34. The edges are configured such that adjacent monitors 20 can be brought together in a close fashion so as to avoid any gaps between adjacent monitors 20, and otherwise minimizes the spacing between adjacent sub-images. A thin flat aluminum bracket can be attached to the outer (4) edges of each monitor to provide a flat surface when the monitors 20 come together for a formation. This will lessen the chance of monitors "slipping", as the some monitor bodies are curved at the edges.

The front of the monitor 20 includes the screen 36. The rear of the monitor may include a mounting surface 38 for affixing handles. More specifically, a bracket 42 is adapted to be secured to the rear mounting surface 38 of the monitor 20. This can be carried out with any number of conventional fasteners, such as threaded screws or bolts. The existing mounting apertures that are present on many conventional monitors may suffice for this purpose. Bracket 42 is formed from upper and lower arms. The arms may be angled away from the rear surface of the monitor 20. A grip 44 is secured at either end of the arms. In this manner opposing grips 44 are provided adjacent each of the opposing side edges 34 of the monitor 20. These grips 44 represent the primary means by which a performer 22 will manipulate the video monitor 20. A lower handle 46 is likewise positioned between the two opposing grips 44 and adjacent to the lower edge 32. Lower handle 46 is adapted to be used when the performer lifts the monitor 20 vertically. Lower handle 46 can be secured by way of an L-shaped bracket or other fastener.

In a most preferred embodiment, the brackets 42 are fashioned from one inch angled aluminum and are attached to the monitor's proprietary bracket mount supports. Attached between the aluminum brackets are two "handles" fashioned from ⅜ inch PVC tubing, with a bolt threaded through both the aluminum and the tubing. This bolt is then tightened down with a lock washer and locking nut. This creates a single solid bracket 42 able to support the full weight of the monitor, laptop, and battery. The PVC tubing is then wrapped with insulating foam rubber to provide cushioning, which in turn is wrapped in gaff tape for durability. The third handle 32 is positioned below the laptop case to provide performers with a means to stabilize the monitor 20 during vertical holds.

Figure 3:
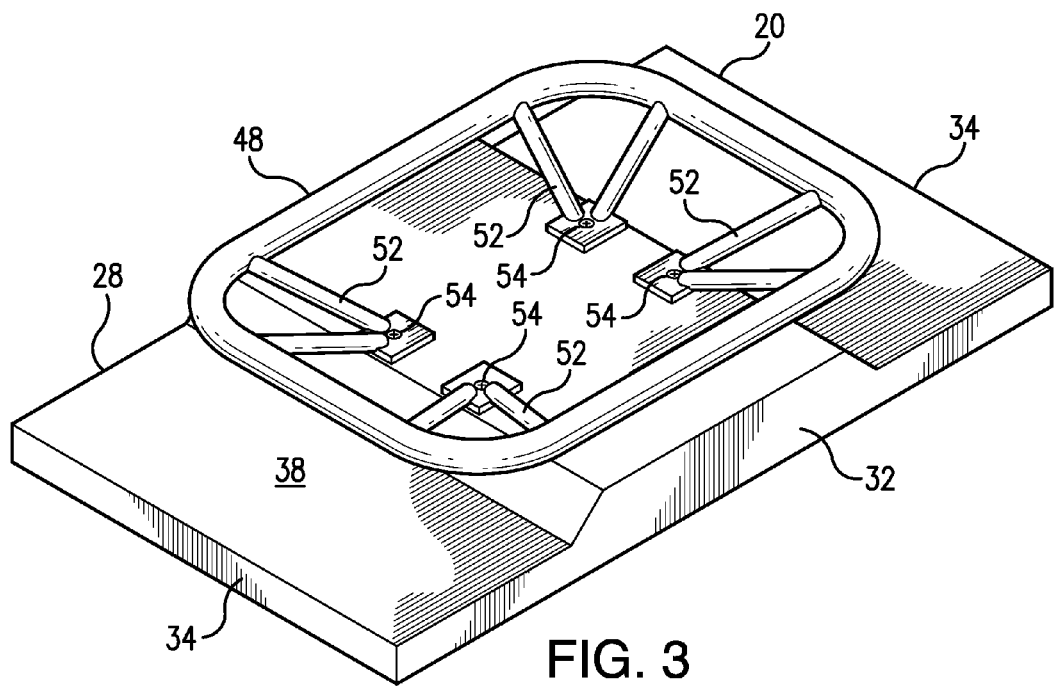
FIG. 3 is a perspective view of an alternative embodiment of an individual handheld video monitor of the present disclosure.

An alternative handle arrangement is depicted in FIG. 3. This embodiment shows a single continuous handle 48 this is formed in a rectangular configuration. This arrangement provides more gripping surfaces for the performer 22. Continuous handle 48 includes four pairs of mounting arms 52. Each pair of mounting arms 52, in turn, includes a threaded fastener 54 that is received within mounting apertures within the rear mounting surface 38 of monitor 20. Continuous handle 48 allows monitor 20 to be held from any angle. Handle 38 will also contain both the battery and laptop in one solid piece, eliminating the need for a separate bag. Handle 38 is preferably constructed from either aluminum or carbon fiber, or a combination of both. It will attach to the monitor 20 via the existing bracket mount hardware.

Figure 2:
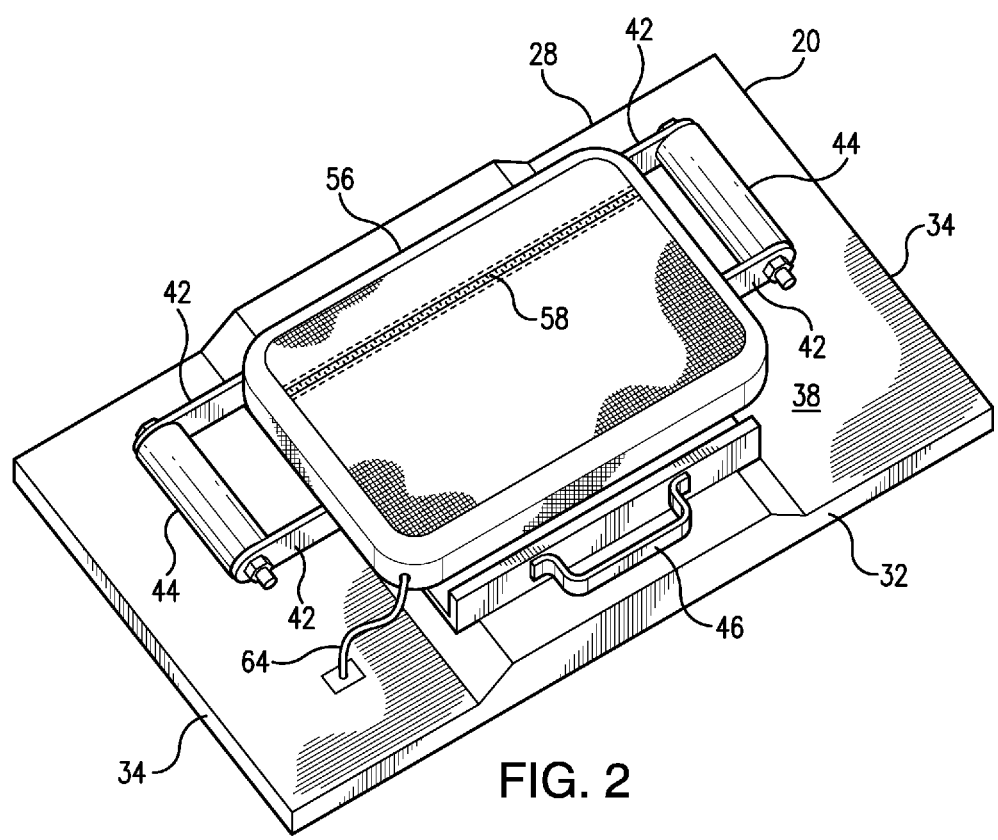
FIG. 2 is a perspective view of the rear of an individual handheld video monitor of the present disclosure.
Figure 4:
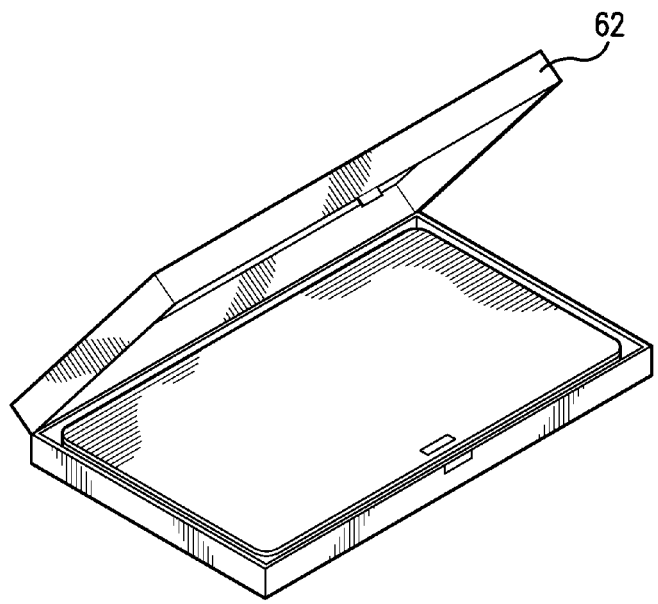
FIG. 4 is a perspective view of an alternative computer case for an individual handheld video monitor of the present disclosure.

With reference again to FIG. 2, the computer associated with each monitor is preferably a laptop 50 that is secured within a flexible computer case 56. Case 56 is preferably formed from neoprene and includes an opening along its upper edge. The opening in case 56 can be secured by way of a zipper 58 or other similar fastening member. Computer case 56 is ideally secured to rear surface of monitor 20. In particular, case 56 may be secured to the upper and lower bracket 42 arms via flexible zip ties. The use of the fastening means is within the scope of the present disclosure. In an alternative embodiment, a rigid computer case 62 is used in lieu of the flexible computer case. FIG. 4 depicts the rigid computer case 62. Case 62 can be secured to the upper and lower bracket arms 42 or to mounting arms 52 via suitable fasteners. The hard shell case 62 can be modified to allow air circulation to prevent electronics from overheating.

Case 62, in one embodiment, is fashioned from perforated aluminum to allow for maximum heat dissipation. The laptop battery (or batteries) are housed in a separate compartment adjacent to the laptop. The compartment will lock to prevent electronics from exiting during a performance. Separate cases can be used for the laptop and the batteries. The station for the batteries can be formed from a water tight case that houses sixteen or more individual battery chargers. Case 62 is provided with a power input and pass through to allow for multiple stations to be linked together. The case for the batteries can be ventilated with multiple cooling fans mounted to the interior top plate of the case. The individual battery chargers are preferably mounted immediately below the fans. The bottom layer of the case can house termination strips which power will be supplied to female ICE panel-mount connectors. All chargers will be hard-wired into their respective wire terminals (hot, neutral, ground) with an additional lead that extends to a female panel-mount Edison connector to allow daisy chaining of charging stations. The charger leads that connect the batteries will extend up through the top panel via drilled access ports to allow for their full extension.

The laptop associated with each of the monitors includes a battery which may be a lithium ion (or "Li-ion") battery. A series of these batteries may be included within the laptop case to power the laptop and ensure that it is powered during the course of extended performances. Each laptop 50 additionally includes a wireless controller 68, which in one particular embodiment may be a Wi-Fi receiver. Other wireless controllers can also be used, such as infrared based controllers.

As is conventional, each laptop 50 also includes a video cable 64 interconnecting the laptop 50 to the associated video monitor 20. An aperture may be included in the laptop case (56 or 62) to allow for the passage of this video cable 64. In the preferred embodiment, the connection to the monitor 20 is made via a (3) foot SVGA cable, secured by thumb screws into the SVGA input port on the monitor. A video signal is taken from the output of the mini display port on the laptop, then pass through a mini display-to-SVGA adapter. The SVGA cable will attach to the adapter via two thumb screws. The adapter will then be connected to the mini display port for signal transmission. The fail-safe connection device will be an 8-inch strip of one inch wide heavy-duty Velcro, fastened to the mini display adapter, then secured to the top and bottom sides of the laptop when it is in the closed position. This prevents accidental removal of the cable during performance.

Although a conventional laptop 50 can be used with each monitor 20, it is preferably modified for the described purpose. In one modification, the power switch is removed to prevent accidental triggering, or powering down, due to its location on the monitor. This is accomplished by (depending on the make and model of the laptop) removing a rear panel and associated screws, and then pulling the on-off button off the power actuator. This renders the power button inaccessible from the outer monitor casing. Once re-assembled, a small piece of electrical tape is then placed over the exterior infrared sensor to prevent unwanted infra-red radiation from triggering the On/Off function. That tape is peeled back and replaced to allow activation and deactivation of the monitors during performance.

Each laptop 50 runs associated software for playing back the pre-recorded images or video. In one particular embodiment, the video playback software is Play Back Pro™ made my DT Videolabs of Phoenix, Ariz. Laptops 50 also run additional software to prevent the system from shutting down after the unit has been closed. This software allows the laptop to function normally during performance.

Figure 5:
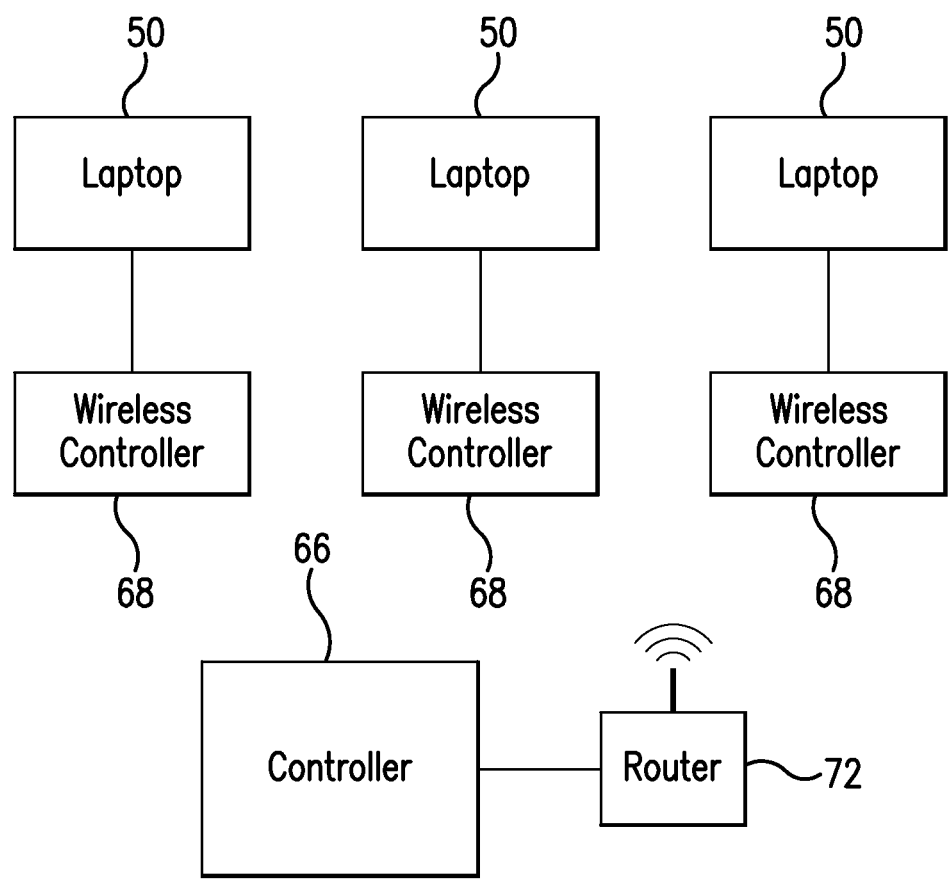
FIG. 5 is a schematic view of the synchronization system of the present disclosure.

The system further includes a controller 66, which may also be a laptop, that is in wireless communication with the wireless controllers 68 in each laptop (FIG. 5). In this regard controller 66 may include a wireless router 72 for communicating with each of the individual laptops 50 used in the performance. The connection between the controller 66 and the individual controlled laptops 50 may be established by way of a virtual private network (VPN) or remote desktop software such as Mac Remote Desktop™. This allows the operator of the controller 66 to operate the video playback software running on each of the individual laptops. It also allows the controller 66 to, by utilizing the video playback software, control the speed at which the images are displayed by each individual video monitor 20. In this manner the controller 66, under the operation of a director or choreographer, can synchronize the pre-recorded images being displayed by the video playback software during the performance. This ensures that none of the sub-images 24 get out of synch with the adjacent sub-images 24.

The system thus described is a theatrical live or pre-recorded video performance act that combines performers and wireless video monitors. This disclosure describes the use of wireless video monitors and the way the content is generated for these monitors and how they interact via performers holding the monitors and the way they are staged and choreographed. The wireless video monitors are powered by a battery source. The video monitors have a computer to generate content to the screen. The computers are synced up through computer software. A main control computer is used to coordinate the sync between all of the wireless monitors. The video monitors are altered with handles for the performer to hold them as well as an enclosed protected case is attached to the back of the screens to hold the battery, computer, and connecting wires. The video content is created to be mapped across all the screens being used. Monitors are individual wireless video monitors creating a video wall when put together. Content is designed to create one image across number of screens being used or to create different video wall shapes, i.e. a moving video wall/walls. Choreography, staging, music, costume, performer, and/or story for video may be applied to make a unique performance act. The computers can also be used independently with a performer holding them for individual performance or atmospheric use in the form of informational and directional devices.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system for generating and synchronizing video during a theatrical performance by a number of individual performers, the system comprising:
  a series of handheld video monitors, each video monitor being manipulated by one of the performers during the theatrical performance, each video monitor adapted to display a sub-image, with the sub-images from the series of video monitors collectively forming a larger composite image, each video monitor comprising:
    an upper edge, a lower edge, and opposing side edges, a front screen for displaying the sub-image, and a rear mounting surface, a bracket secured to the rear mounting surface, a pair of opposing grips secured to each end of the bracket, each grip being positioned adjacent one of the opposing side edges, a lower handle positioned between the two opposing grips and adjacent the lower edge, a flexible neoprene computer case with a zippered opening, the computer case being secured to the bracket;
    a laptop computer with a wireless controller and a battery, the laptop computer secured within the computer case, a video cable interconnecting the laptop to the video monitor, the laptop adapted to run video playback software for controlling the speed at which the sub-images are displayed;
  a controller in wireless communication with the wireless controllers of each of the laptops, the controller selectively controlling the video playback software of each laptop and thus and the speed at which the sub-images are displayed, whereby the controller can synchronize the sub-images across all of the video monitors during the course of a performance.

2. A system for generating and synchronizing video displays during a theatrical performance by a number of individual performers, the system comprising:
  a series of handheld video monitors, each of the video monitors being manipulated by one of the individual performers during the theatrical performance, each video monitor adapted to display a series of sub-images, with the sub-images from the series of handheld video monitors collectively forming a larger composite image, each of the video monitors including a handle for allowing the video monitor to be manipulated and further including a computer for controlling the display of the sub- images;
  each video monitor further comprising an upper edge, a lower edge, and opposing side edges, a front screen for displaying the sub-image, and a rear mounting surface, a bracket with two ends, the bracket secured to the rear mounting surface, wherein the handle comprises a grip secured to each end of the bracket.

3. The system as described in claim 2 further comprising a lower handle positioned between the grips and adjacent the lower edge of the video monitor.

4. The system as described in claim 2 further comprising a computer case for securing the computer, the computer case being secured to the video monitor.

5. The system as described in claim 2 further wherein each computer is adapted to run video playback software for controlling the display of the sub-images, the video playback software controlling the speed at which the sub-images are presented.

6. The system as described in claim 5 further comprising a wireless controller associated with each computer, the system further comprising a control computer in wireless communication with the wireless controllers of each of the computers, the control computer selectively controlling video playback software of each computer and thus the speed at which the sub-images are displayed, whereby the control computer can synchronize the sub-images across all of the video monitors during the performance.

* * * * *